United States Patent
Hayden, Sr.

(10) Patent No.: US 6,321,618 B1
(45) Date of Patent: Nov. 27, 2001

(54) CUTTING TIP HAVING ROUNDED MAIN CUTTING EDGE AND SHARP SIDE CUTTING EDGES

(75) Inventor: Robert C. Hayden, Sr., Branford, CT (US)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/307,558

(22) Filed: May 10, 1999

(51) Int. Cl.[7] .................................................. B23D 63/00
(52) U.S. Cl. .............................................. 76/112; 76/50.2
(58) Field of Search ............................... 76/112, 82, 37, 76/44, 45, 47.1, 48, 50, 50.2; 451/57, 45; 83/174, 174.1, 835

(56) References Cited

U.S. PATENT DOCUMENTS

| | | |
|---|---|---|
| 1,242,726 | * 10/1917 | Robbins . |
| 1,643,148 | * 9/1927 | Avery . |
| 3,063,310 | * 11/1962 | Connoy . |
| 3,820,419 | * 6/1974 | McLagan . |
| 4,019,408 | * 4/1977 | Idel . |
| 4,771,659 | * 9/1988 | Schmolke . |
| 5,249,485 | * 10/1993 | Hayden, Sr. . |
| 5,992,204 | * 11/1999 | Jonkka et al. . |
| 6,067,888 | * 5/2000 | Achterberg et al. . |

FOREIGN PATENT DOCUMENTS

1389950 * 4/1988 (SU) ........................................ 76/112

* cited by examiner

Primary Examiner—Kenneth E. Peterson
(74) Attorney, Agent, or Firm—Burns, Doane, Swecker & Mathis, L.L.P.

(57) ABSTRACT

A metalcutting tool, such as a band saw blade, is formed by providing a body having at least one tooth, the tooth including a cutting tip having a rake face, a clearance face intersecting the rake face to form a main cutting edge therewith, and a pair of side faces intersecting the rake face to form respective side cutting edges therewith. The main cutting edge and the side cutting edges are subjected to an abrasive rounding operation, and the side cutting edges are thereafter ground to remove any roundness produced therein during the rounding operation.

4 Claims, 3 Drawing Sheets

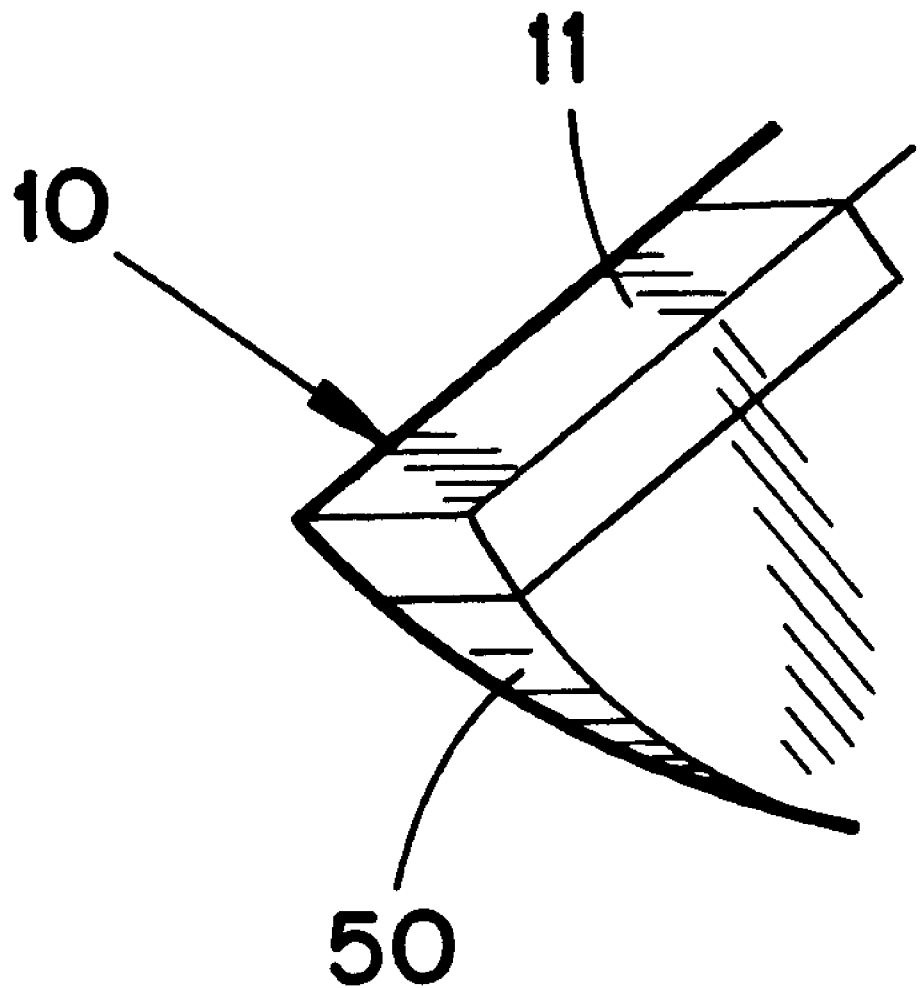

CUTTING TIP HAVING ROUNDED MAIN CUTTING EDGE AND SHARP SIDE CUTTING EDGES

BACKGROUND OF THE INVENTION

The invention relates to saw blades and especially to a cutting edge configuration for a saw blade.

It has been long known that for the cutting edges of tools, such as saws, there is an optimal degree of sharpness, as expressed by the radius measured in a cross section through the cutting edge. The optimal radius depends on the material to be cut, on the material of the cutting edge, on the depth of cut and on the cutting edge geometry.

Too large of a radius will generate an excessively large cutting force and irregular chips, which in turn will produce irregular surfaces with bad precision. Too small of a radius will make the cutting edge vulnerable to fracture and cracking, and the edge will vibrate, producing scratches and cracks in the cut surface. An optimal radius will, when cutting metals, allow the formation of a small built-up edge from the cut material around the actual edge, protecting the latter from wear and cracking. Normal values for the edge radius are 15–60 microns for cutting of metals. If the edge of a fresh tool is sharper than that, it will need a running-in period, during which an edge rounding will gradually be produced by wear. During the running-in period the cutting must be done with reduced feed.

Another way of reducing edge cracking is to ensure that the direction of the chip flow is well defined and continuous. If two flows of cut material meet while traveling in different directions, there will occur a very high and fluctuating local pressure, which will cause damage and local erosion and cratering of the rake face near the edge. This occurs where two cutting edges meet at a corner.

The above-outlined principles will now be explained with reference to FIGS. 1A–4. FIG. 1A shows part of a conventional saw blade body 11 with teeth 9, where the teeth are provided with cutting tips 10 formed of a wear resisting material such as cemented carbide. Some of the teeth may be set and some teeth may be straight (unset). The tips are brazed or welded onto the blade body. Alternatively, the tips could be integral parts of the blade body, or separate inserts held in seats in the blade body. Each tip has a rake face 12, two side faces 13 (only one side face visible in FIG. 1), and a clearance face (not visible) projecting beyond the respective surfaces of the tooth 9. A grinding step is then performed on those faces to make them flush with the respective tooth surfaces, as shown in FIG. 1B. As the result of the grinding, the rake face 12 is intersected by the clearance face to form a main cutting edge 14, and is also intersected by the side faces to form a pair of side cutting edges 15. The side faces 13 intersect the clearance face to form a pair of clearance edges 17. If the teeth are to be set, a setting operation is preferably performed after the grinding step.

Most of the cutting effort and the cutting force occurs on the main edge 14. It has been learned that if that edge is too sharp, it may possess micro-cracks and similar defects which can result in premature deterioration of the cutting edge.

Moreover, an overly sharp main cutting edge produces another disadvantage in the case of a flexible blade, such as a band saw blade. That is, a main cutting edge on a band saw blade which is too sharp will tend to pull (feed) into the workpiece (i.e., the blade becomes self-feeding), as permitted by the flexibility of the band saw blade. However, once the main cutting edge has been pulled-in to a certain extent, the band saw blade becomes tensioned and snaps back out of the work, thereby setting up a vibration which can damage the main cutting edge.

The above-described problems relating to an overly sharp main cutting edge can be prevented by rounding-off the main cutting edge. That is, it has been shown that in order to attain smooth cutting and longer life of the cutting tip, the main edge should be slightly rounded, e.g., by abrasive rounding methods such as abrasive brushing or blasting. This will remove micro-cracks and similar defects which occurred during manufacture of the tip, and provide a rounded area where a small and stable built-up edge will form during cutting.

However, the abrasive rounding step has additional consequences that are beneficial in some cases and disadvantageous in other cases. That is, the abrasive rounding procedure serves to round-off not only the main cutting edge, but also the portions of the side cutting edges 15 and the clearance edges 17 situated adjacent the ends of the main cutting edge 14, as can be seen in FIGS. 1C and 1D. In effect, the corner J formed at the junction between those edges 14, 15 and 17 becomes rounded, i.e., almost spherical in shape. When a tooth tip according to FIG. 1D is penetrating workpiece 10, as shown in FIG. 2, a chip C will be formed by the main edge 14 which travels parallel to the side edges. Due to the roundness of the corners J, corner chips C' will also be formed at the respective corners, which travel corner chips diagonally inwardly. Where those chip flows C,C' meet, there will occur a local pressure peak which generates enough frictional heat to break down the rounded corners. Furthermore, the thickness of each corner chip C' is not uniform; rather, the portion of the corner chip produced at the upper end of the corner is much thinner than the lower portion of the corner chip and is thus unable to absorb as much heat. As a result, more of the heat must be absorbed by the cutting tip.

The local pressure peaks can also deflect, deform and merge the chip flows to create a non-flat chip having a generally V-shaped cross-section, i.e., along a center line CL of the chip there is formed a peak. In cutting operations where the depth of cut is large, e.g., in the machining of grooves, that is an advantageous occurrence, because the chips will be narrow and straight-flowing, allowing them to flow easily out of the groove being cut, which is often so important that the extra wear due to the pressure peaks 31 will be accepted.

However, in other cases, i.e., where the depth of the cut is shallower, such as in the sawing of metals or in the use of band saw blades, it is preferred to have flat chips which will form compact curls capable of being carried out of the cut by the saw teeth. Thus, in those cases, heat, wear and chip deformation caused by the presence of local pressure peaks cannot be tolerated.

In the case of band saw blades, then, the abrasive rounding is not performed. Instead, the blade undergoes a running-in period wherein the blade is made to cut continuously for numerous hours until the main cutting edge has been sufficiently worn that the above-described self-feeding tendency is overcome. That running-in procedure, however, is costly and time consuming.

An object of the present invention is to provide a shape of a cutting edge that will ensure a unique chip flow to reduce the edge wear near the corner, and a method to produce such an edge shape, which avoids the need for an extended running-in period. Tools which could be provided with this type of edge include a band saw, a circular saw, a parting or grooving tool, or an insert to be used in such a tool.

SUMMARY OF THE INVENTION

One aspect of the invention involves a method of forming a metalcutting tool comprising the steps of:

A) providing a body having at least one tooth, whereby the tooth includes a cutting tip having a rake face, a clearance face intersecting the rake face to form a main cutting edge therewith, and a pair of side faces intersecting the rake face to form respective side cutting edges therewith, the side cutting edges extending from respective ends of the main cutting edge;

B) abrasively rounding the main cutting edge and the side cutting edges; and

C) grinding each of the side cutting edges at least along a section thereof situated adjacent the main cutting edge to remove the roundness of that section.

The invention also pertains to a metalcutting tool comprising at least one tooth. The tooth includes a cutting tip having a rake face, a clearance face intersecting the rake face to form a main cutting edge therewith, and a pair of side faces intersecting the rake face to form respective side cutting edges therewith. The main cutting edge is rounded, and the side cutting edges have greater sharpness than the main cutting edge at least along sections of the side cutting edges disposed at respective ends of the main cutting edge.

BRIEF DESCRIPTION OF THE DRAWINGS

The objects and advantages of the invention will become apparent from the following detailed description of a preferred embodiment thereof in connection with the accompanying drawings in which like numerals designate like elements and in which:

FIG. 5 is a bottom perspective view of a tooth and its cutting tip.

DETAILED DESCRIPTION OF A PREFERRED EMBODIMENT OF THE INVENTION

Figure 1A:
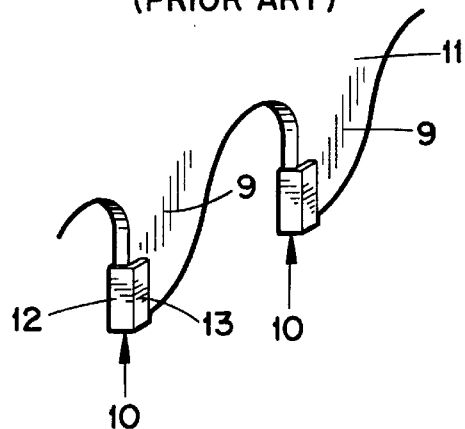
FIG. 1A is a front perspective view of a prior art saw blade prior to a grinding of hard cutting tips thereof.
Figure 1B:
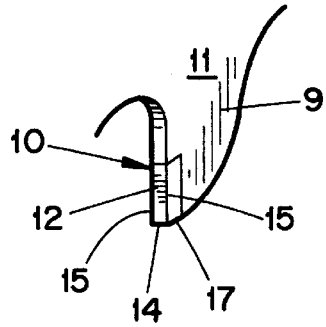
FIG. 1B is a view similar to FIG. 1A after the cutting tips have been ground flush with the tooth surfaces.
Figure 1D:
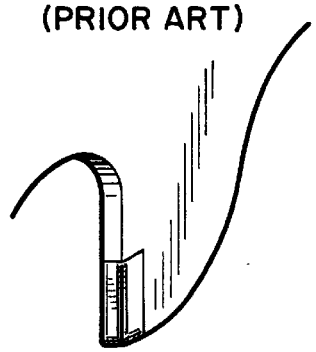
FIG. 1D is a perspective view of the tooth following the rounding operation.
Figure 1C:
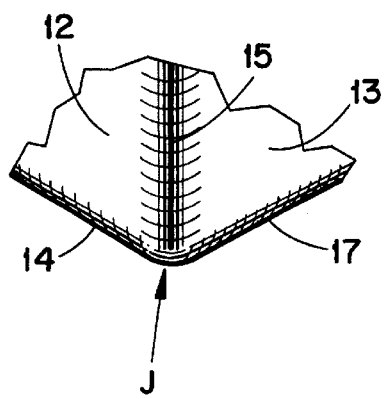
FIG. 1C is an enlarged fragmentary view of a corner of the tip depicted in FIG. 1B following an abrasive edge-rounding operation.
Figure 2:
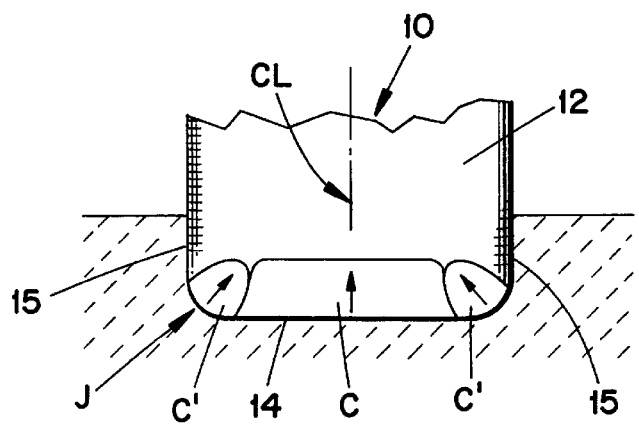
FIG. 2 is a schematic front view of the prior art tooth depicted in FIG. 2 during a cutting operation in which the tooth forms a chip.
Figure 3A:
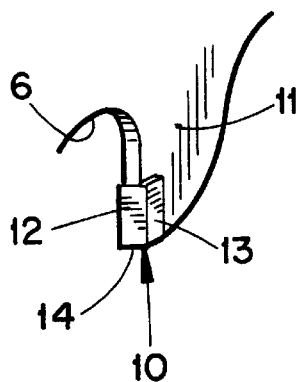
FIG. 3A is a front perspective view of a tooth of a saw blade and a hard cutting tip following a partial grinding of the cutting tip, according to the present invention.

In accordance with the present invention, a saw blade body 11 as shown in FIG. 1A is initially provided. As explained earlier, the blade body 11 has teeth 9 in which gullets 6 and tip seats have been formed by grinding or milling. Some of the teeth may be set, whereas others of the teeth may be straight (unset). As will become apparent, the invention is applicable to saw blades in which all of the teeth are straight (unset). Carbide cutting tips 10 formed of a wear resistant material such as cemented carbide brazed are welded onto the blade body. Each tip has a rake face 12, two side faces 13 (only one being visible in FIG. 1A) and a bottom clearance face 50 (see FIG. 5). Those faces initially all project beyond the respective tooth surfaces. A grinding step is then performed on the rake face 12 and the clearance face to make those faces flush with the respective tooth surfaces, as shown in FIG. 3A. Note that, contrary to the previously-described prior art method, the side faces 13 are not yet ground flush.

Next, the main cutting edge 14 is subjected to a conventional abrasive rounding step, e.g., by engaging the main cutting edge sequentially with two abrasive brushes (not shown) in a conventional manner. That is, the abrasive rounding of the edge 14 is preferably done with abrasive brushing in two directions, first from the clearance face 50 towards the edge 14, and the secondly from the rake face 12 towards the edge 14. As explained earlier, during such a step, the side edges 15 and the clearance edges 17 will also be engaged by the brushes, whereby not only does the main cutting edge 14 become rounded, but the side edges 15 and the clearance edges 17 become rounded as well (see FIG. 3B). The abrasive rounding could alternatively be performed by grit blasting or other conventional methods.

Figure 3C:
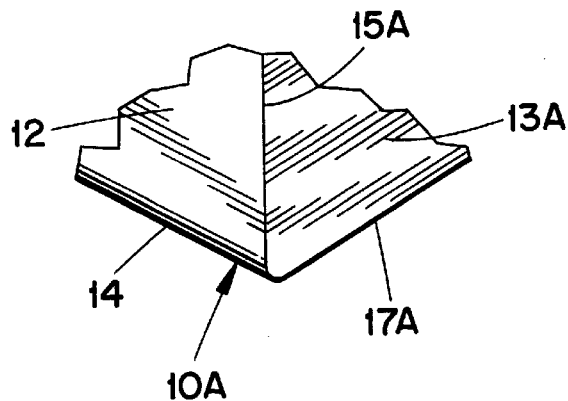
FIG. 3C is an enlarged fragmentary view of a corner of the cutting tip following a further grinding operation.
Figure 3B:
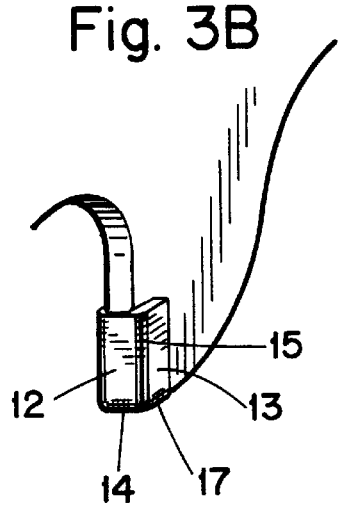
FIG. 3B is a view similar to FIG. 3A following an abrasive edge-rounding operation.
Figure 3D:
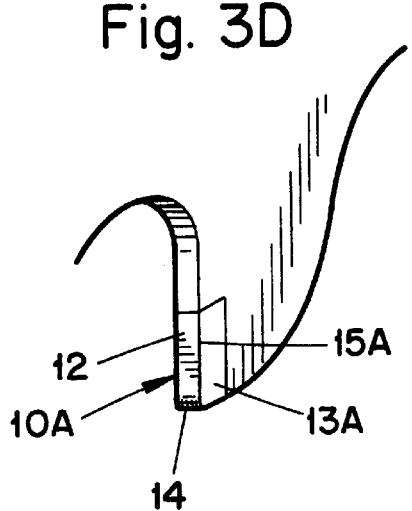
FIG. 3D is a front perspective view of the tooth having the cutting tip of FIG. 3C.

Thereafter, the side faces 13 are subjected to grinding steps wherein preferably the entire area of each side face 13 (or at least the section thereof located adjacent a respective end of the main cutting edge) is ground flat. The grinding is of sufficient depth to remove virtually all of the roundness of the side edges and clearance edges. As a result, the side faces 13A and the clearance face are flush with the respective tooth surfaces, and a tip 10A is provided wherein the main cutting edge 14 is rounded, but the side edges 15A and clearance edges 17A are relatively sharp, as shown in FIGS. 3C and 3D. Also, the corner J' formed by the intersection of the side edges 15A with the main edge 14 is relatively sharp.

Then, a setting operation is performed to set the teeth which are to be set, if any.

As a final cleaning step, the teeth may be subjected to a grit-blasting operation which might take some of the sharpness off the side cutting edges, but those side cutting edges will still be very sharp compared to the main cutting edge.

Figure 4:
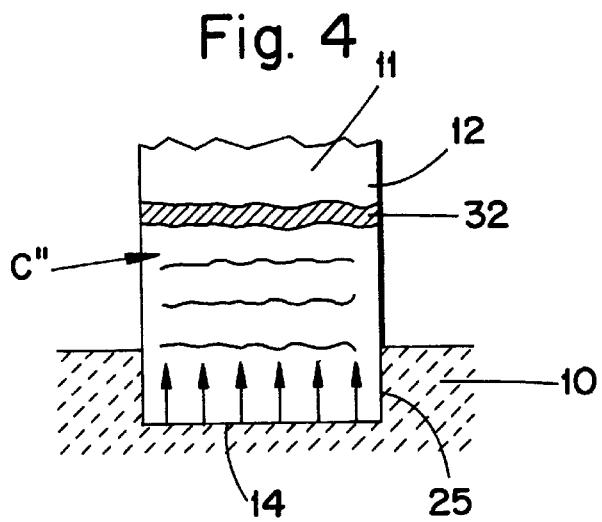
FIG. 4 is a front view of the cutting tip depicted in FIG. 3D during a cutting operation in which a chip is being formed, with an optional chaffering of the cutting tip depicted in broken lines.

When utilizing the tip 10A to cut a workpiece, as shown in FIG. 4, there will be no chip formation from the relatively sharp corners J', but rather there will occur only a smooth chip flow from the main edge 14 as represented by the arrows in FIG. 4. Those chips C" will have a flat cross-section 32, and will produce no local pressure peaks. The result will be lower cutting forces, easier chip handling and less tooth wear. When those chips break and curl, they will form compact rolls, but with a certain risk of friction against the kerf sides, which can be accepted since they are transported out of the cut by the tooth gullets. There will occur less heat transfer to the tip 10A at the corners and thus less thermal breakdown of the corners.

The main edge 14 is preferably straight to get the smoothest chip flow, but it could alternatively be convex or be different from one tooth to the next, to reduce lateral vibrations. The original side faces need not be perpendicular to the rake face, but instead could be made with longitudinal and vertical clearance angles as in the prior art, and the smoothly ground portion of the side faces 13A should preferably have smaller or zero clearance angles, since it needs not extend higher than the cutting depth. The original side faces 13 may be flat or parts of a spherical surface.

The invention has been described above in connection with a saw blade having set teeth, wherein it is preferable that the side faces of the carbide cutting tips be ground flush with the respective tooth surfaces. However, the invention is also applicable to saw blades having only straight (unset) teeth, wherein such a flush relationship is not preferred. That is, the faces of the carbide cutting tip can project outwardly past the respective tooth faces, so there is no need to grind the tip faces flush with the respective tooth surfaces in the case of saw blades having only unset teeth. Such a saw blade would, from a distance, appear as shown in FIG. 3A, but the cutting edges would be as shown in FIG. 3C, at least near the corner. If the side edges 15 are made with a radial clearance angle, the sharply ground edges 15A need only constitute a short portion located near the corner.

It will be appreciated that the present invention provides a cutting tool wherein the main cutting teeth are rounded to eliminate micro-cracks and similar defects, as well as preventing self-feeding of the tool during cutting. Importantly, no pressure peaks are formed on the rake face since there are no colliding chip flows which could otherwise result in excessive frictional heat and lateral chip deformation. Thus, the cutting edges wear more slowly, and the chips are flat and straight-flowing.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A method of forming a metalcutting tool comprising the steps of:

A) providing a body having at least one tooth on which is disposed a cutting tip having a rake face, a clearance face intersecting the rake face to form a main edge therewith, and a pair of side faces intersecting the rake face to form respective side edges therewith, the side edges extending from respective ends of the main edge, wherein the rake face, the clearance face, and the side faces are situated adjacent respective rake, clearance and side tooth surfaces, and project beyond their respective tooth surfaces; thereafter B) grinding the rake face and the clearance face to cause the main edge, while the side faces remain projected beyond their respective tooth surfaces to define a main cutting edge; thereafter C) abrasively rounding the main cutting edge; and thereafter D) grinding each of the side faces at least along a section thereof situated adjacent the main cutting edge prior to a first cutting operation, to eliminate any rounding along said side edges of said section of said side faces to cause the side edges to define side cutting edges.

2. The method according to claim 1, wherein step C is performed by brushing the main cutting edge.

3. The method according to claim 2, wherein the brushing is performed in a first stage from the clearance face and thereafter in a second stage from the rake face.

4. The method according to claim 1 wherein step D comprises grinding each of the side faces at least along a section thereof oriented perpendicular to the rake face.

* * * * *

UNITED STATES PATENT AND TRADEMARK OFFICE
CERTIFICATE OF CORRECTION

PATENT NO. : 6,321,618 B1 Page 1 of 1
DATED : November 27, 2001
INVENTOR(S) : Robert Hayden It is certified that error appears in the above-identified patent and that said Letters Patent is hereby corrected as shown below:

<u>Title page,</u>
Item [75], Inventor, should read -- Robert C. Hayden, Sr., Branford, CT
Håkan Hellbergh, Lidköping (SE) --.

Signed and Sealed this

Twenty-eighth Day of June, 2005

JON W. DUDAS
*Director of the United States Patent and Trademark Office*